US012626441B2

(12) United States Patent
Zeng et al.

(10) Patent No.: US 12,626,441 B2
(45) Date of Patent: May 12, 2026

(54) VIRTUAL IMAGE PROCESSING BASED ON A FACE OF A DETECTION OBJECT METHOD AND APPARATUS, AND ELECTRONIC DEVICE, AND COMPUTER-READABLE STORAGE MEDIUM

(71) Applicant: Lemon Inc., Grand Cayman (KY)

(72) Inventors: Weihong Zeng, Beijing (CN); Xu Wang, Beijing (CN); Jing Liu, Los Angeles, CA (US); Shen Sang, Los Angeles, CA (US); Haishan Liu, Beijing (CN)

(73) Assignee: LEMON INC., Grand Cayman (KY)

( * ) Notice: Subject to any disclaimer, the term of this patent is extended or adjusted under 35 U.S.C. 154(b) by 175 days.

(21) Appl. No.: 18/570,571

(22) PCT Filed: Oct. 21, 2022

(86) PCT No.: PCT/SG2022/050750
§ 371 (c)(1),
(2) Date: Dec. 14, 2023

(87) PCT Pub. No.: WO2023/075682
PCT Pub. Date: May 4, 2023

(65) Prior Publication Data
US 2024/0290023 A1 Aug. 29, 2024

(30) Foreign Application Priority Data
Oct. 25, 2021 (CN) .......................... 202111241017.2

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/248* (2017.01); *G06T 7/55* (2017.01); *G06T 7/64* (2017.01);
(Continued)

(58) Field of Classification Search
None
See application file for complete search history.

(56) References Cited

U.S. PATENT DOCUMENTS

2006/0082579 A1* 4/2006 Yao .......................... G06T 11/00
345/473
2015/0084950 A1* 3/2015 Li ............................ G06T 7/251
345/419
(Continued)

FOREIGN PATENT DOCUMENTS

CN 101847268 A 9/2010
CN 105139438 A 12/2015
(Continued)

OTHER PUBLICATIONS

International Search Report issued in corresponding International Application No. PCT/SG2022/050750 dated Jun. 21, 2023.
(Continued)

*Primary Examiner* — Zhengxi Liu
(74) *Attorney, Agent, or Firm* — Astute IP Law Group

(57) ABSTRACT

An image processing method and apparatus, an electronic device, and a computer-readable storage medium are provided. The image processing method includes: in response to having detected a detection object, acquiring current feature information of the detection object; acquiring limit deformation information of the target feature, wherein the limit deformation information is obtained by calculating a target virtual sub-image when the target feature is in at least one limit state; determining movement information of a feature
(Continued)

point in an initial virtual image based on the limit deformation information and the current feature information, wherein the initial virtual image is obtained by superimposing a plurality of virtual sub-images; and driving, according to the movement information, the feature point in the initial virtual image to move, so as to generate the current virtual image corresponding to the current state.

18 Claims, 7 Drawing Sheets

(51) Int. Cl.

| | | |
|---|---|---|
| *G06T 7/55* | (2017.01) |
| *G06T 7/64* | (2017.01) |
| *G06T 19/20* | (2011.01) |
| *G06V 40/16* | (2022.01) |

(52) U.S. Cl.
CPC ............ *G06T 19/20* (2013.01); *G06V 40/171* (2022.01); *G06T 2207/30201* (2013.01); *G06T 2219/2021* (2013.01)

(56) References Cited

U.S. PATENT DOCUMENTS

| | | | | |
|---|---|---|---|---|
| 2018/0125357 A1* | 5/2018 | Suzuki | .................. | A61B 3/145 |
| 2020/0184278 A1* | 6/2020 | Zadeh | .................... | G06N 3/044 |

FOREIGN PATENT DOCUMENTS

| | | | | |
|---|---|---|---|---|
| CN | 105139438 | B | * | 1/2018 |
| CN | 107705341 | A | | 2/2018 |
| CN | 108717719 | A | | 10/2018 |
| CN | 110363135 | A | | 10/2019 |
| CN | 110458781 | A | | 11/2019 |
| CN | 110557625 | A | | 12/2019 |
| CN | 112135160 | A | | 12/2020 |
| CN | 112184538 | A | | 1/2021 |
| CN | 112750071 | A | | 5/2021 |

OTHER PUBLICATIONS

Office Action for Chinese Patent Application No. 202111241017.2, mailed on Dec. 3, 2025, 11 pages.

* cited by examiner

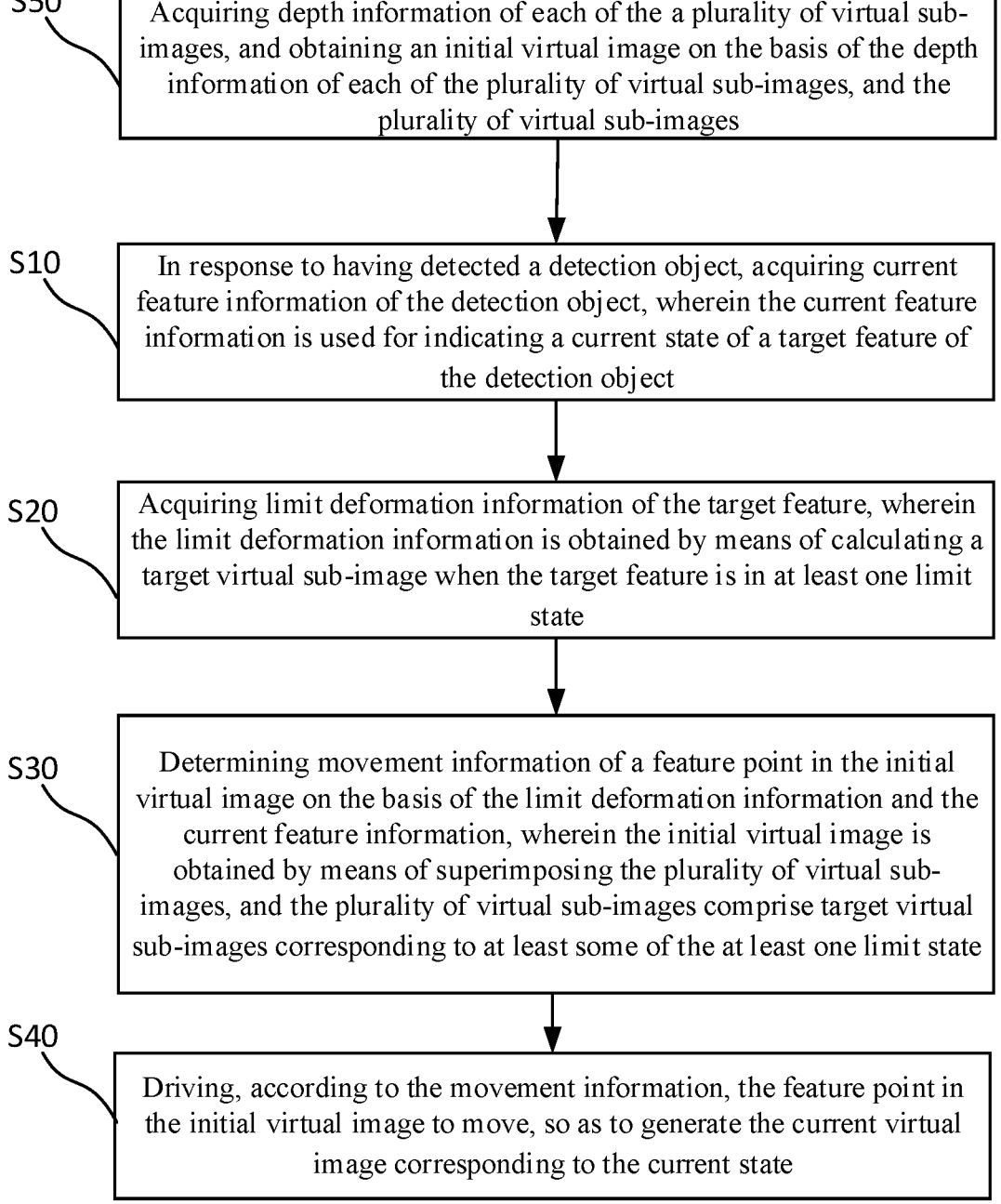

S50 — Acquiring depth information of each of the a plurality of virtual sub-images, and obtaining an initial virtual image on the basis of the depth information of each of the plurality of virtual sub-images, and the plurality of virtual sub-images S10 — In response to having detected a detection object, acquiring current feature information of the detection object, wherein the current feature information is used for indicating a current state of a target feature of the detection object S20 — Acquiring limit deformation information of the target feature, wherein the limit deformation information is obtained by means of calculating a target virtual sub-image when the target feature is in at least one limit state S30 — Determining movement information of a feature point in the initial virtual image on the basis of the limit deformation information and the current feature information, wherein the initial virtual image is obtained by means of superimposing the plurality of virtual sub-images, and the plurality of virtual sub-images comprise target virtual sub-images corresponding to at least some of the at least one limit state S40 — Driving, according to the movement information, the feature point in the initial virtual image to move, so as to generate the current virtual image corresponding to the current state

FIG. 1A

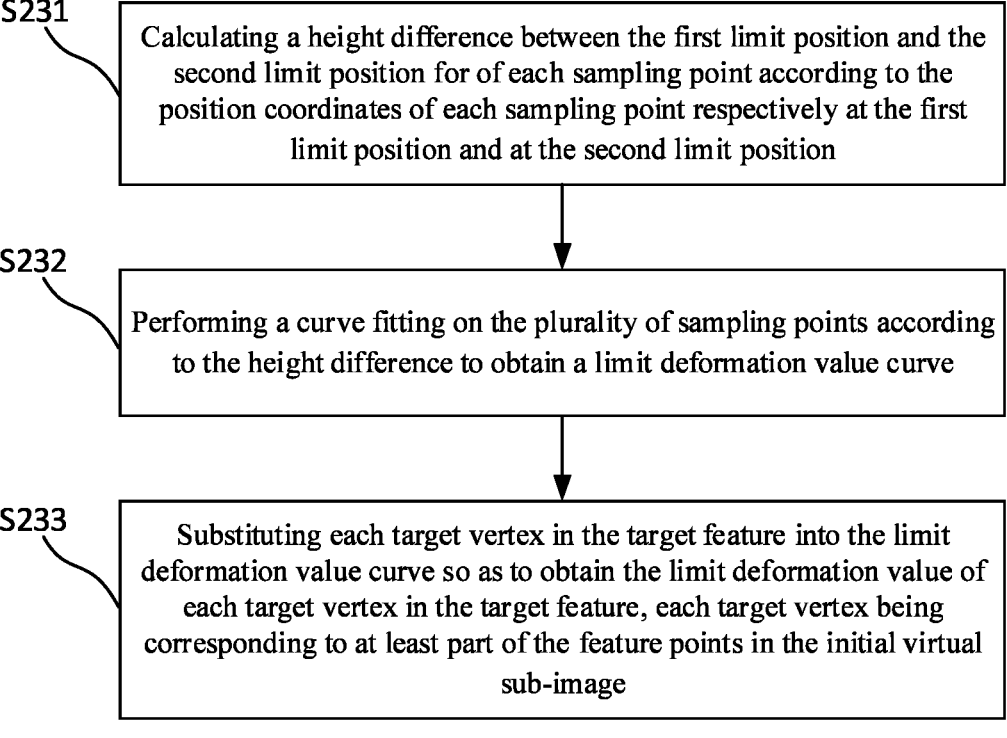

S231 Calculating a height difference between the first limit position and the second limit position for of each sampling point according to the position coordinates of each sampling point respectively at the first limit position and at the second limit position S232 Performing a curve fitting on the plurality of sampling points according to the height difference to obtain a limit deformation value curve S233 Substituting each target vertex in the target feature into the limit deformation value curve so as to obtain the limit deformation value of each target vertex in the target feature, each target vertex being corresponding to at least part of the feature points in the initial virtual sub-image

FIG. 2D

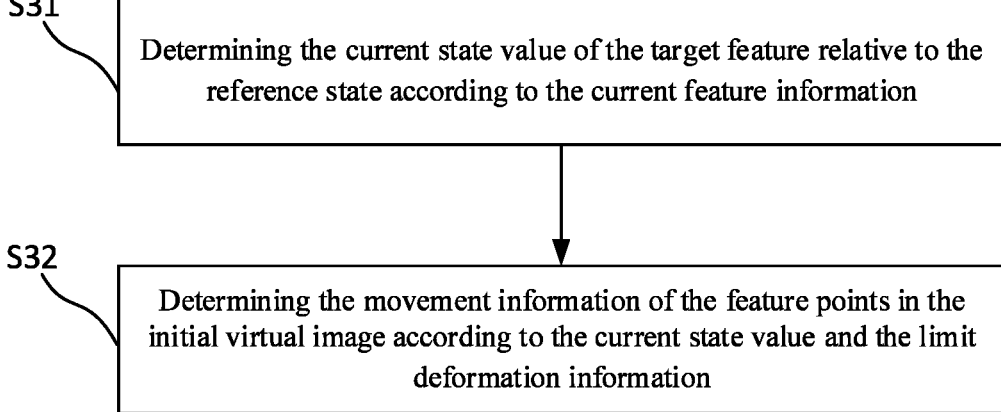

S31 Determining the current state value of the target feature relative to the reference state according to the current feature information S32 Determining the movement information of the feature points in the initial virtual image according to the current state value and the limit deformation information

FIG. 3

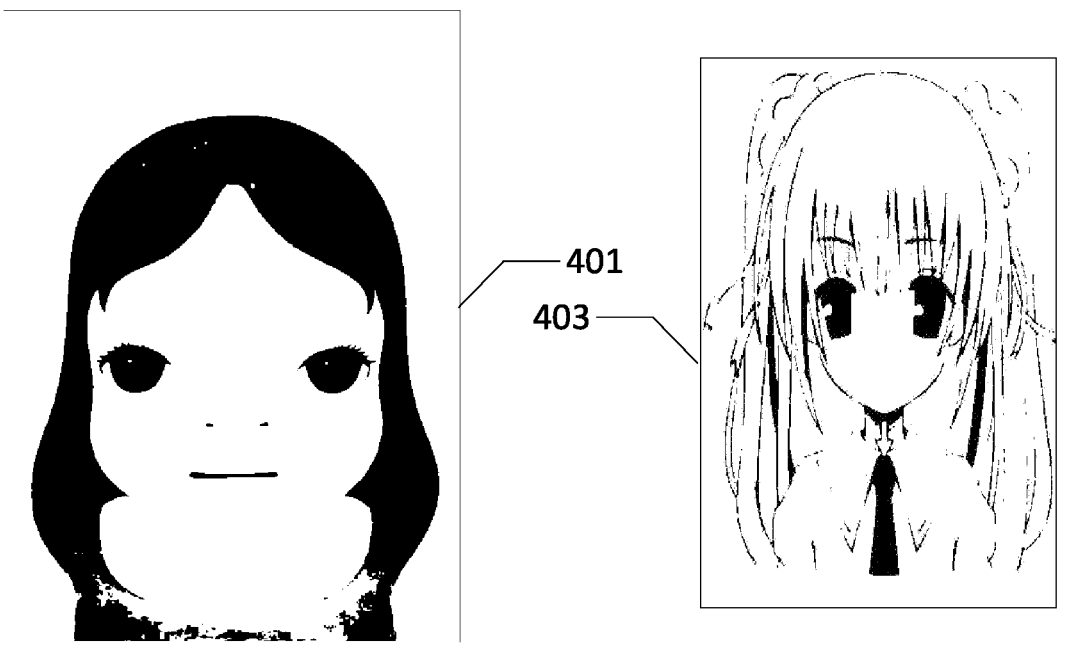
401
403
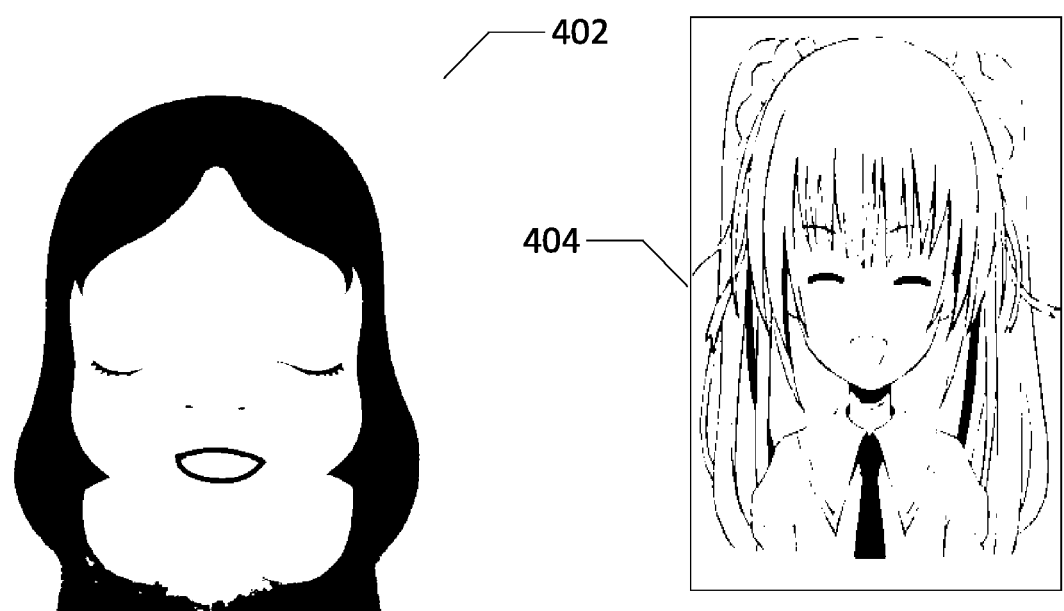
402
404
FIG. 4

900

1

VIRTUAL IMAGE PROCESSING BASED ON A FACE OF A DETECTION OBJECT METHOD AND APPARATUS, AND ELECTRONIC DEVICE, AND COMPUTER-READABLE STORAGE MEDIUM

CROSS-REFERENCE TO RELATED APPLICATION

The presentation application is a national stage application filed under 35 U.S.C. 371 based on International Patent Application No. PCT/SG2022/050750, filed Oct. 21, 2022, which claims priority to Chinese Patent Application No. 202111241017.2 filed on Oct. 25, 2021, the disclosures of which are incorporated herein by reference in their entireties.

TECHNICAL FIELD

The embodiments of the present disclosure relate to an image processing method and apparatus, an electronic device and a computer-readable storage medium.

BACKGROUND

With the rapid development of the Internet, virtual images are widely used in the emerging fields such as live broadcasts, short videos, and games. The application of virtual images not only makes human-computer interaction more interesting but also brings convenience to users. For example, on live broadcast platforms, anchors can use virtual images to broadcast live without showing their faces.

SUMMARY

At least one of the embodiments of the present disclosure provides an image processing method, which includes: in response to having detected a detection object, acquiring current feature information of the detection object, and the current feature information being used for indicating a current state of a target feature of the detection object; acquiring limit deformation information of the target feature, and the limit deformation information being obtained by calculating a target virtual sub-image when the target feature is in at least one limit state; determining movement information of feature points in an initial virtual image on the basis of the limit deformation information and the current feature information, the initial virtual image being obtained by superimposing a plurality of virtual sub-images, and the plurality of the virtual sub-images including a target virtual sub-image corresponding to at least part of the at least one limit state; and driving the feature points in the initial virtual image to move according to the movement information, so as to generate a current virtual image corresponding to the current state.

For example, the image processing method provided by one of the embodiments of the present disclosure, further includes: acquiring depth information of each of the plurality of the virtual sub-images, and obtaining the initial virtual image on the basis of the depth information of each of the plurality of the virtual sub-images and the plurality of the virtual sub-images.

For example, in the image processing method provided by one of the embodiments of the present disclosure, acquiring the limit deformation information of the target feature, includes: determining the first limit position and the second limit position of the target feature according to the target virtual sub-image in the at least one limit state; sampling the first limit position and the second limit position so as to obtain a sampling result of the plurality of sampling points; and calculating the sampling result so as to obtain the limit deformation information of the target feature.

For example, in the image processing method provided by one of the embodiments of the present disclosure, the target virtual sub-image in the at least one limit state includes the first image layer in the first limit state and the second image layer in the second limit state; and determining the first limit position and the second limit position of the target feature according to the target virtual sub-image in the at least one limit state, including: masking alpha channels of the first image layer and the second image layer respectively so as to obtain two mask sub-images, and merging the two mask sub-images into one mask image; and determining the first limit position and the second limit position according to the mask image.

For example, in the image processing method provided by one of the embodiments of the present disclosure, the sampling result includes position coordinates of each of the plurality of the sampling points respectively at the first limit position and at the second limit position, and calculating the sampling result so as to obtain the limit deformation information of the target feature includes: calculating a height difference between the first limit position and the second limit position of each sampling point according to the position coordinates of each sampling point respectively at the first limit position and at the second limit position; obtaining a limit deformation value curve by performing a curve fitting on the plurality of the sampling points according to the height difference; and substituting each of target vertexes in the target feature into the limit deformation value curve so as to obtain a limit deformation value of each of the target vertexes in the target feature, and each of the target vertexes being corresponding to at least part of the feature points in the initial virtual sub-image.

For example, in the image processing method provided by one of the embodiments of the present disclosure, the curve fitting includes a polynomial fitting, and the limit deformation curve includes a polynomial curve.

For example, in the image processing method provided by one of the embodiments of the present disclosure, the sampling result includes position coordinates of each sampling point of the plurality of the sampling points respectively at the first limit position and at the second limit position, and calculating the sampling result so as to obtain the limit deformation information of the target feature includes: calculating a height difference between the first limit position and the second limit position of each sampling point according to the position coordinates of each sampling point respectively at the first limit position and at the second limit position; and using the height difference between the first limit position and the second limit position of each sampling point as the limit deformation information.

For example, in the image processing method provided by one of the embodiments of the present disclosure, determining the movement information of feature points in the initial virtual image on the basis of the limit deformation information and the current feature information, includes: determining a current state value of the target feature relative to a reference state according to the current feature information; and determining the movement information of the feature points in the initial virtual image according to the current state value and the limit deformation information.

For example, in the image processing method provided by one of the embodiments of the present disclosure, determining the current state value of the target feature relative to the reference state according to the current feature information, includes: acquiring a mapping relationship between feature information and a state value; and determining the current state value of the target feature relative to the reference state according to the mapping relationship and the current feature information.

For example, in the image processing method provided by one of the embodiments of the present disclosure, acquiring the mapping relationship between the feature information and the state value includes: acquiring a plurality of samples, wherein each of the samples includes a corresponding relationship between sample feature information of the target feature and a sample state value; and constructing a mapping function on the basis of the corresponding relationship, wherein the mapping function represents the mapping relationship between the feature information and the state value.

For example, in the image processing method provided by one of the embodiments of the present disclosure, the sample feature information includes the first feature information and the second feature information, the sample state value includes the first value corresponding to the first feature information and the second value corresponding to the second feature information, and constructing the mapping function on the basis of the corresponding relationship includes: constructing a system of linear equations; and substituting the first feature information and the first value, and the second feature information and the second value respectively into the system of the linear equations, and solving the system of the linear equations to obtain the mapping function.

For example, in the image processing method provided by one of the embodiments of the present disclosure, the movement information includes a movement distance, and determining the movement information of the feature points in the initial virtual image according to the current state value and the limit deformation information includes: calculating the current state value and the limit deformation information so as to determine the movement distance of the feature points in the initial virtual image.

For example, in the image processing method provided by one of the embodiments of the present disclosure, calculating the current state value and the limit deformation information so as to determine the movement distance of the feature points in the initial virtual image includes: multiplying the current state value and the limit deformation information so as to determine the movement distance of the feature points in the initial virtual image.

For example, in the image processing method provided by one of the embodiments of the present disclosure, the movement information includes a movement distance, and driving the feature points in the initial virtual image to move according to the movement information includes: driving the feature points in the target virtual sub-image of the initial virtual image to move by the movement distance from a position where an initial state is located to a position where one of at least one limit state different from the initial state is located.

For example, in the image processing method provided by one of the embodiments of the present disclosure, the movement information includes a target position, and driving the feature points in the initial virtual image to move according to the movement information includes: driving the feature points in the initial virtual image to move to the target position.

For example, in the image processing method provided by one of the embodiments of the present disclosure, the current feature information includes comparison information between the target feature and a reference feature of the detection object, wherein the comparison information does not change when a distance of the detection object relative to an image acquisition device used for detecting the detection object changes.

For example, in the image processing method provided by one of the embodiments of the present disclosure, the depth information of each of the plurality of the virtual sub-images includes a depth value of each virtual sub-image and a depth value of feature points in each virtual sub-image, each virtual sub-image corresponds to one of a plurality of features to be virtualized of the detection object, and the plurality of the features to be virtualized include the target feature. In a direction perpendicular to a face of the detection object, the depth value of each of the virtual sub-images is proportional to a first distance, and the first distance is a distance between a feature to be virtualized corresponding to the virtual sub-image and eyes of the detection object; and the depth value of the feature points in each of the virtual sub-images is proportional to the first distance.

For example, in the image processing method provided by one of the embodiments of the present disclosure, the target feature includes at least one of eyelashes and a mouth. When the target feature is the eyelashes, a limit state of the target feature is a state of the target feature upon opening the eyes of the detection object, and when the target feature is the mouth, the limit state of the target feature is a state of the mouth upon opening the mouth to a maximum extent.

At least one of the embodiments of the present disclosure provides an image processing apparatus, which includes: a detection unit that is configured to acquire current feature information of a detection object in response to having detected the detection object, wherein the current feature information is used for indicating a current state of a target feature of the detection object; an acquisition unit that is configured to acquire limit deformation information of the target feature, wherein the limit deformation information is obtained by calculating a target virtual sub-image when the target feature is in a limit state; a determination unit that is configured to determine movement information of feature points in an initial virtual image on the basis of the limit deformation information and the current feature information, wherein the initial virtual image is obtained by superimposing the plurality of virtual sub-images, and the plurality of the virtual sub-images include at least part of the target virtual sub-image; and a driving unit that is configured to drive the feature points in the initial virtual image to move according to the movement information so as to generate a current virtual image corresponding to the current state.

At least one of the embodiments of the present disclosure provides an electronic device, which includes: a processor; and a memory, which includes one or more computer program modules. The one or more computer program modules are stored in the memory and are executed by the processor. The one or more computer program modules include instructions that are used to implement the image processing method provided by any one of the embodiments of the present disclosure.

At least one of the embodiments of the present disclosure provides a computer-readable storage medium, which is configured to store non-temporary computer readable instructions. When the non-temporary computer-readable instructions are executed by a computer, the image processing method provided by any one of the embodiments of the present disclosure is implemented.

BRIEF DESCRIPTION OF THE DRAWINGS

In order to illustrate the technical solutions of the embodiments of the present disclosure more clearly, the drawings of the embodiments are introduced briefly below. Obviously, the drawings described below only relate to some embodiments of the present disclosure, and are not the limitation on the present disclosure.

FIG. 1A illustrates a flowchart of an image processing method provided by at least one embodiment of the present disclosure;

FIG. 2D illustrates a method flowchart of step S23 in FIG. 2A provided by at least one embodiment of the present disclosure;

FIG. 3 illustrates a method flowchart of step S30 in FIG. 1A provided by at least one embodiment of the present disclosure;

FIG. 4 illustrates a schematic diagram of the effect of an image processing method provided by at least one embodiment of the present disclosure;

DETAILED DESCRIPTION

Figure 1B:
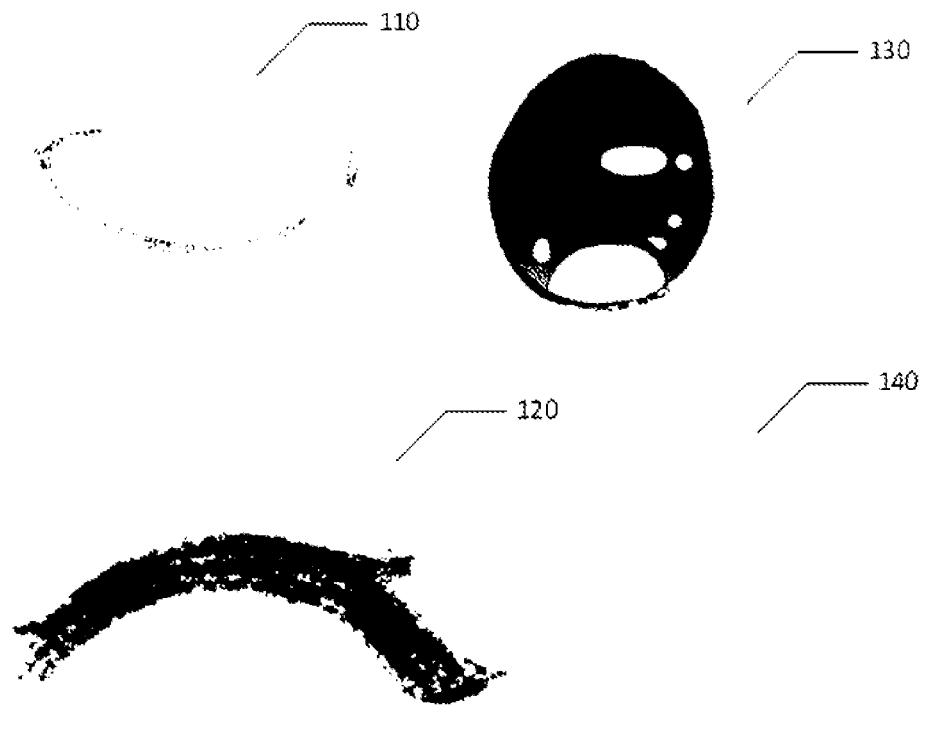
FIG. 1B schematically illustrates a schematic diagram of a plurality of virtual sub-images provided by some embodiments of the present disclosure

In order to make the purpose, the technical scheme and the advantages of the embodiments of the present disclosure clearer, the following will describe the technical scheme of the embodiments of the present disclosure clearly and completely, in conjunction with the accompanying drawings of the embodiments of the present disclosure. Obviously, the described embodiments are partial embodiments of the present disclosure instead of the whole embodiments. Based on the described embodiments of the present disclosure, all other embodiments obtained by those of ordinary skill in the art without the need for creative labor, belong to the scope of the protection of the present disclosure.

Unless otherwise defined, the technical terms or the scientific terms used in the present disclosure should have ordinary meanings understood by the ordinary skill in the art to which the present disclosure belongs. "First", "second" and the similar words used in the present disclosure do not represent any order, quantity, or importance, but are just used to distinguish different components. As well, "a/an", "one" or "the" or the similar words do not represent a quantitative limitation, but represent the existence of at least one. "Include" or "comprise" or such similar words represent that the element or object appearing before the word covers the element or object listed after the word and its equivalents, instead of excluding other components or objects. "Link" or "connect" or such similar words are not limited to physical or mechanical connections, but may include electrical connections, whether direct or indirect. "Up", "down", "left", "right", and the like are only used to represent the relative position relationships, and when the absolute position of the described object changes, the relative position relationship may also change accordingly.

Both the actions and expressions of a virtual image can be driven in real time according to the actions and expressions of an object (for example, a user) detected by an electronic device. It is difficult to design and drive a virtual image. The production of a three-dimensional virtual image requires image art design, character model production, and animation skeletal binding, and the further driving and presentation of a virtual image further involves motion capture technology, holographic hardware technology, augmented reality (AR) technology, virtual reality (VR) technology, and the development of drive programs, leading to a long production cycle for a three-dimensional virtual image, great implementation difficulty and driving difficulty, and high costs. The production of a two-dimensional virtual image requires professional original drawing design according to the requirements of different original drawing design platforms, frame-by-frame drawing of each frame of animation to form actions and expressions upon driving, and performing material transformation on a specific drawing software (such as Live2D), also leading to great implementation difficulty and driving difficulty.

At least one embodiment of the present disclosure provides an image processing method and apparatus, an electronic device, and a computer-readable storage medium. The image processing method includes: in response to having detected a detection object, acquiring current feature information of the detection object, the current feature information being used for indicating a current state of a target feature of the detection object; acquiring limit deformation information of the target feature, the limit deformation information being obtained by calculating a target virtual sub-image when the target feature is in a limit state; determining movement information of feature points in an initial virtual image on the basis of the limit deformation information and the current feature information, the initial virtual image being obtained by superimposing a plurality of virtual sub-images and the plurality of virtual sub-images including at least part of the target virtual sub-image; and driving the feature points in the initial virtual image to move according to the movement information so as to generate a current virtual image corresponding to the current state. The image processing method can reduce the difficulty in designing and driving a virtual image, thus making the virtual image be implemented and driven easily.

FIG. 1A illustrates a flowchart of an image processing method provided by at least one embodiment of the present disclosure.

As illustrated in FIG. 1A, the method may include steps S10 to S40.

Step S10: in response to having detected a detection object, acquiring current feature information of the detection object, wherein the current feature information is used for indicating a current state of a target feature of the detection object.

Step S20: acquiring limit deformation information of the target feature, wherein the limit deformation information is obtained by means of calculating a target virtual sub-image when the target feature is in at least one limit state.

Step S30: determining movement information of a feature point in the initial virtual image on the basis of the limit deformation information and the current feature information, wherein the initial virtual image is obtained by means of superimposing the plurality of virtual sub-images, and the plurality of virtual sub-images comprise target virtual sub-images corresponding to at least some of the at least one limit state.

Step S40: driving, according to the movement information, the feature point in the initial virtual image to move, so as to generate the current virtual image corresponding to the current state.

The embodiment can determine the movement information of the feature points in the initial virtual image according to the target virtual sub-image corresponding to the limit state of the target feature and the current state of the target feature, thereby driving the feature points to move according to the movement information, so as to generate the current virtual image corresponding to the current state.

In the embodiments of the present disclosure, by acquiring in real time the current state of the target feature of the detection object and driving the feature points in the initial virtual image to move according to the current feature information of the current state, the generation and driving of the virtual image can be implemented. Therefore, the embodiments of the present disclosure can implement the generation and driving of a virtual image without using animation skeletal binding technology, holographic hardware technology or the like, or a specific drawing software (such as Live2D), reducing the difficulty in realizing and driving the virtual image.

For step S10, for example, the detection object may be an object to be virtualized, and the object to be virtualized may be, for example, a living body such as a person or a pet. For example, the detection object may be obtained by being detected by a detection apparatus (a camera, an infrared device, or the like).

In some embodiments of the present disclosure, the detection object includes features to be virtualized, and the features to be virtualized include target features. For example, the features to be virtualized are features that need to be virtualized in the detection object, the target features are key parts of the detection object, and the key parts are parts that need to be driven in the virtual image obtained after the virtual features to be virtualized are virtualized. For example, the features to be virtualized of the detection object may include but are not limited to cheeks, shoulders, hairs, and five sense organs. For example, in the features to be virtualized, cheeks and shoulders are parts that do not need to be driven in the virtual image, but eyebrows, upper eyelashes, lower eyelashes, a mouth, upper eyelids, lower eyelids, and the like need to be driven in the virtual image. Therefore, the target features may include but are not limited to eyebrows, upper eyelashes, lower eyelashes, a mouth, upper eyelids, lower eyelids, and the like.

For example, in response to detecting the detection objection by a camera, the current feature information of the detection object is acquired. For example, a plurality of face key points are used for positioning and detecting the detection object, thereby acquiring the current feature information of the detection object. For example, an algorithm for 106 face key points detection or an algorithm for 280 face key points detection can be used, and other applicable algorithms can also be used. No limitation is made in this regard by the embodiments of the present disclosure.

In some embodiments of the present disclosure, for example, the current feature information includes facial action information, body posture information, and the like of the detection object. For example, the current feature information can indicate the opening degree of the eyes, the opening degree of the mouth, and the like of the detection object.

In some embodiments of the present disclosure, the current feature information includes comparison information between the target feature and the reference feature of the detection object. The comparison information does not change when the distance of the detection object relative to the image acquisition device used for detecting the detection object changes.

For example, when the detection object is at different distances from the camera, as long as the expression of the detection object remains unchanged, the current feature information does not change, which can reduce the jitter of the virtual image caused by the change in the distance between the detection object and the camera.

For example, the reference feature can be faces, eyes, and the like. For example, the current feature information may include the ratio $h1/h0$ of the height $h1$ from the eyebrow to the eye to the height $h0$ of the face, the ratio $h2/h0$ of the height $h2$ of the key points of the upper and lower eyelids of the eye to the height $h0$ of the face, the ratio $h3/k0$ of the distance $h3$ from the pupil to the outer corner of the eye to the width $k0$ of the eye, and the ratio $s1/s0$ of the area $s1$ of the mouth to the area $s0$ of the face, e.g., the height of the eyebrow is represented by the ratio $h1/h0$, the opening degree of the eye is represented by the ratio $h2/h0$, the position of the pupil is represented by the ratio $h3/k0$, and the opening degree of the mouth is represented by the ratio $s1/s0$.

For step S20, in the embodiments of the present disclosure, the target feature has a limit state, and the limit state of the target feature is, for example, the maximum deformation state of the target feature. For example, when the target features are upper eyelashes and upper eyelids, the limit state of the target feature includes the state of the target feature when the eyes of the detection object are opened to the maximum extent. For example, when the target features are upper eyelashes, the limit state of the upper eyelashes includes the state of the upper eyelashes when the eyes of the detection object are opened to the maximum extent. When the target feature is a mouth, the limit state of the target feature includes the state of the mouth when the mouth is opened to the maximum extent.

In some embodiments of the present disclosure, when the target features are upper eyelashes and upper eyelids, the limit state of the target feature may also include the state of the target feature when the eyes of the detection object are closed. For example, when the target features are upper eyelashes, the limit state of the upper eyelashes not only includes the state of the upper eyelashes when the eyes of the detection object are opened to the maximum extent, but also includes the state of the upper eyelashes when the eyes are closed. When the target feature is a mouth, the limit state of the target feature includes not only the state of the mouth when the mouth is opened to the maximum extent, but also the state of the mouth when the mouth is closed.

In some embodiments of the present disclosure, the target virtual sub-image may be pre-drawn by a designer when the target feature of the detection object is in a limit state. For example, the designer may pre-draw the target virtual sub-image corresponding to the upper eyelashes when the eyes are opened to the maximum, and the target virtual sub-image corresponding to the upper eyelashes when the eyes are closed.

For step S20, the limit deformation information may refer to the maximum deformation value of the target feature. For example, the limit deformation information may be obtained by calculating the limit positions of a plurality of sampling points in the target feature when the target feature is in two limit states respectively. An embodiment of step S20 is described below with reference to FIG. 2A, and no further detail will be given herein.

For step S30, in some embodiments of the present disclosure, for example, the plurality of virtual sub-images may be extracted and drawn by the designer in image production software, and the plurality of virtual sub-images are used as a plurality of image layers which are superimposed to obtain an initial virtual image. For example, according to the image layer name preset by the designer, the corresponding image is drawn in the image layer, so that the image layer can be invoked and driven according to the image layer name. For example, the plurality of virtual sub-images are drawn in advance by the designer using a drawing tool such as Photoshop and the like, and are stored in the storage unit. For example, the plurality of virtual sub-images are obtained by reading the psd. file of the Photoshop drawing tool from the storage unit. Of course, the embodiments of the present disclosure are not limited to this, and the designer may use any software or tool to draw virtual sub-images.

FIG. 1B schematically illustrates a schematic diagram of a plurality of virtual sub-images provided by some embodiments of the present disclosure.

As illustrated in FIG. 1B, the plurality of virtual sub-images include a mouth image 110, an upper eyelash image 120, a pupil image 130, and an eye white image 140.

It should be understood that FIG. 1B only illustrates some virtual sub-images, not all virtual sub-images. For example, the plurality of virtual sub-images also include images of hairs, images of noses, and the like. The designer may draw the required virtual sub-images according to actual needs.

The plurality of virtual sub-images include target virtual sub-images corresponding to at least part of the at least one limit state. For example, the target feature has two limit states, and the plurality of virtual sub-images include a target virtual sub-image corresponding to one of the limit states in the target feature. For example, the plurality of virtual sub-images include the target virtual sub-image of the eyelashes when the eyes are opened to the maximum extent, e.g., the initial virtual image is the corresponding virtual image when the eyes are opened to the maximum extent.

For example, in FIG. 1B, the mouth image 110 is an image when the mouth is opened to the maximum extent, and the upper eyelash image 120 is an image when the eyes are opened to the maximum extent.

For example, each virtual sub-image corresponds to one of a plurality of features to be virtualized of the detection object, and the plurality of features to be virtualized include the target feature.

For example, in addition to the target virtual sub-image when the target feature is in a limit state, the plurality of virtual sub-images may further include virtual sub-images and background images of some parts of the virtual feature that do not need to be driven. For example, the plurality of virtual sub-images further include virtual sub-images of cheeks and shoulders in addition to respective target virtual sub-images of eyebrows, upper eyelashes, lower eyelashes, a mouth, upper eyelids, lower eyelids, and the like. The background image is, for example, an environment image of the environment where the detection object is located.

In some embodiments of the present disclosure, as illustrated in FIG. 1A, the image processing method may further include step S50 in addition to steps S10 to S40. For example, step S50 may be executed before step S10.

Step S50: acquiring depth information of each of a plurality of virtual sub-images, and obtaining an initial virtual image on the basis of the depth information of each of the plurality of virtual sub-images, and the plurality of virtual sub-images.

The embodiment set depth information for each virtual sub-image, so that the initial virtual image obtained by superimposing the plurality of virtual sub-images has a three-dimensional effect, and thus the virtual image obtained by driving the feature points in the initial virtual image to move also has a three-dimensional effect.

For example, the plurality of virtual sub-images are superimposed to obtain the initial virtual image.

For step S50, the depth information of each of the plurality of virtual sub-images includes a depth value of each virtual sub-image and a depth value of feature points in each virtual sub-image. Each virtual sub-image corresponds to one of a plurality of features to be virtualized of the detection object, and the plurality of features to be virtualized include a target feature.

In some embodiments of the present disclosure, the depth information of each virtual sub-image may be preset by the designer.

In some embodiments of the present disclosure, each virtual sub-image corresponds to one of a plurality of features to be virtualized of the detection object, the plurality of features to be virtualized include target features. In a direction perpendicular to the face of the detection object, the depth value of each virtual sub-image is proportional to the first distance, and the depth value of the feature points in each virtual sub-image is proportional to the first distance. The first distance is the distance between the feature to be virtualized corresponding to the virtual sub-image and the eyes of the detection object. Moreover, in the direction perpendicular to the face of the detection object, the depth value of each virtual sub-image and the depth value of the feature points in each virtual sub-image are proportional to the distance between the virtual sub-image and the eyes of the detection object.

It should be understood that the distance of the present disclosure may be a vector, e.g., the distance may be either a positive value or a negative value.

For example, the plurality of virtual sub-images include a nose virtual sub-image corresponding to the nose of the detection object and a shoulder virtual sub-image corresponding to the shoulders of the detection object. In the direction perpendicular to the face of the detection object, the distance between the feature to be virtualized, the nose, and the eyes of the detection object is −f1, and the distance between the features to be virtualized, the shoulders, and the eyes of the detection object is f2. Both f1 and f2 are greater than 0. Therefore, the depth value of the nose virtual sub-image is less than the depth value of the eye virtual sub-image, and the depth value of the eye virtual sub-image is less than the depth value of the shoulder virtual sub-image. This embodiment is such that visually the nose of the virtual image is in front of the eyes and the shoulders are behind the eyes.

For example, for each virtual sub-image, the virtual sub-image is divided into a plurality of rectangular boxes, the bounding box coordinates of each rectangular box are extracted, and depth values are set for the upper left corner vertex and the lower right corner vertex in each rectangular box according to the first distance. Each vertex of the rectangular box may represent a feature point. The depth value of a vertex of the rectangular box is proportional to the distance between the vertex and the eyes of the detection object.

For example, for the target feature eyebrows, the virtual sub-image of the eyebrows is equally divided into three rectangles, and the bounding box coordinates (X, Y) of the upper left corner vertex and the lower right corner vertex of each of the three rectangles in the image coordinate system are extracted, where X is the abscissa and Y is the ordinate. Moreover, the depth value Z is set for each vertex to obtain the coordinates (X, Y, Z) of each vertex. Meanwhile, the W coordinate and four texture coordinates (s, t, r, q) are added, and each vertex is 8-dimensional. The number of the vertex group is eight in two rows and four columns (2, 4), the first row is (X, Y, Z, W) and the second row is (s, t, r, q). In the image coordinate system, for example, the width direction of the virtual sub-image is the X-axis, the height direction of the virtual sub-image is the Y-axis, and the lower left corner of the virtual sub-image is the coordinate origin.

Compared to the virtual sub-image of the eyebrows, the virtual sub-image of the back hair (the part of the hair away from the eyes of the detection object) is divided into more rectangles, and each rectangle corresponds to a vertex group. In the virtual sub-image of the back hair, the depth value (e.g., z-coordinate) of the middle area is less than the depth value (e.g., z-coordinate) of both sides so as to form a back hair-curved morphology.

Figure 2A:
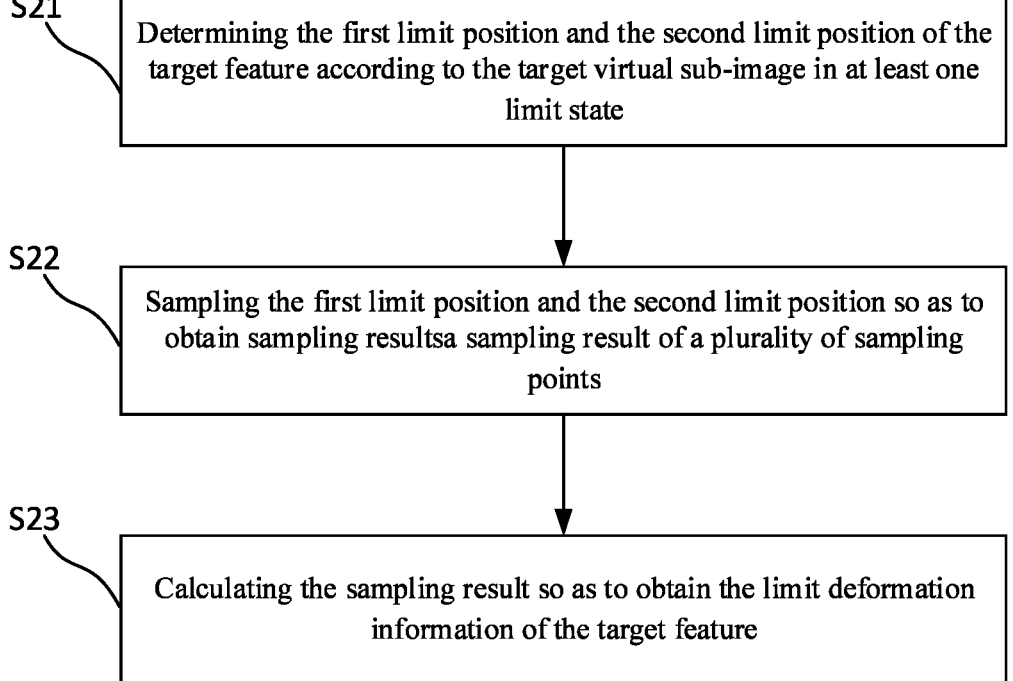
FIG. 2A illustrates a method flow chart of step S20 in FIG. 1A provided by at least one embodiment of the present disclosure.

FIG. 2A illustrates a method flowchart of step S20 in FIG. 1A provided by at least one embodiment of the present disclosure.

As illustrated in FIG. 2A, step S20 may include steps S21 to S23.

Step S21: determining the first limit position and the second limit position of the target feature according to the target virtual sub-image in at least one limit state.

Step S22: sampling the first limit position and the second limit position so as to obtain a sampling result of a plurality of sampling points.

Step S23: calculating the sampling result so as to obtain the limit deformation information of the target feature.

For step S21, the first limit position is the position of the target feature in the virtual image when the target feature is in the first limit state, and the second limit position is the position of the target feature in the virtual image when the target feature is in the second limit state. The position of the target feature can be, for example, indicated by the position coordinates of a plurality of feature points in the target feature.

In some embodiments of the present disclosure, the target virtual sub-image in at least one limit state includes the first image layer in the first limit state and the second image layer in the second limit state, and step S21 includes: masking alpha channels of the first image layer and the second image layer respectively so as to obtain two mask sub-images, and merging the two mask sub-images into one mask image; and determining the first limit position and the second limit position according to the mask image.

Figure 2B:
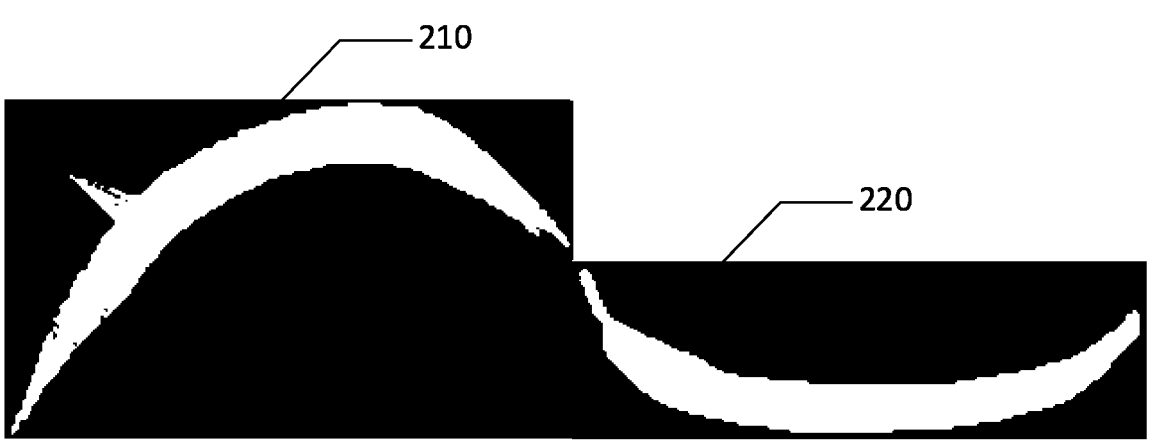
FIG. 2B and FIG. 2C illustrate a schematic diagram of generating a mask image provided by at least one embodiment of the present disclosure.
Figure 2C:
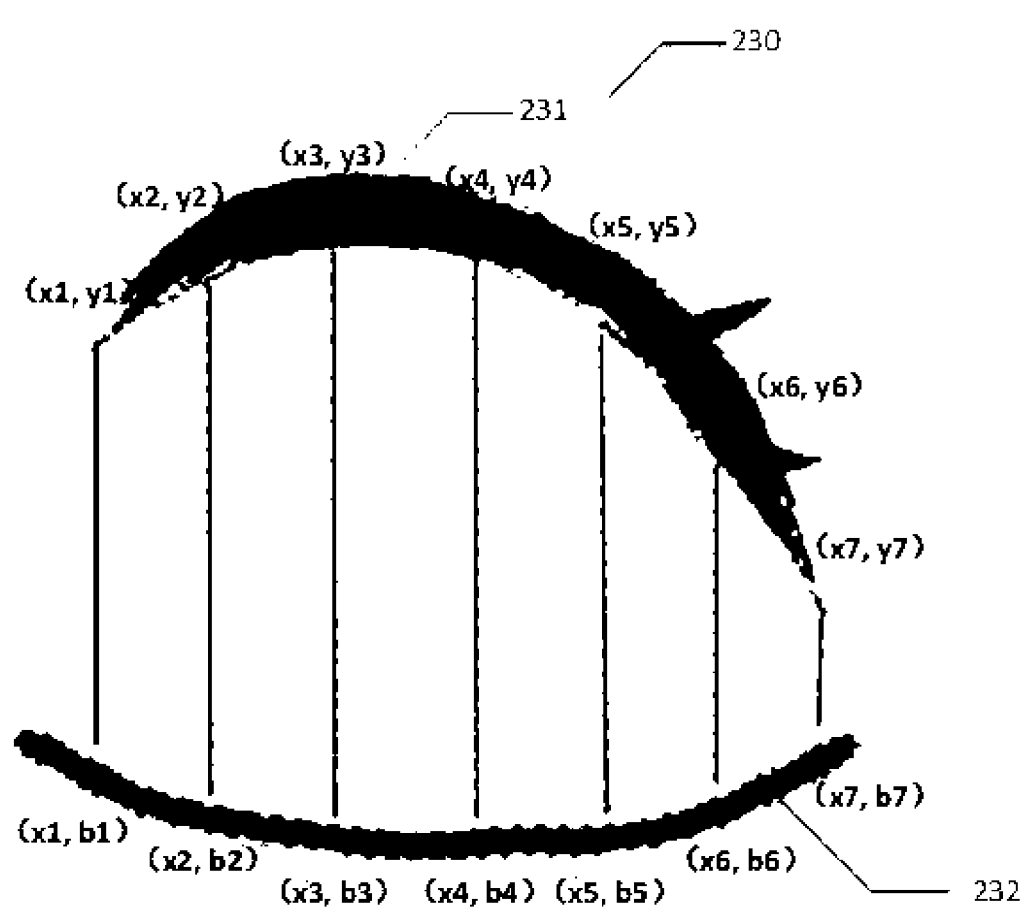

FIG. 2B and FIG. 2C illustrate schematic diagrams of generating a mask image provided by at least one embodiment of the present disclosure.

In the embodiments illustrated in FIG. 2B and FIG. 2C, the target feature is upper eyelashes.

As illustrated in FIG. 2B, mask processing is performed on the alpha channel of the first image layer in the first limit state of the upper eyelashes to obtain a mask sub-image 210 of the first limit state. Mask processing is performed on the alpha channel of the second image layer in the second limit state of the upper eyelashes to obtain a mask sub-image 220 of the second limit state.

As illustrated in FIG. 2C, the mask sub-image 210 and the mask sub-image 220 are merged into one mask image 230. For example, the mask sub-image 210 and the mask sub-image 220 can be merged into one mask image 230 according to the position coordinates of a plurality of feature points in the mask sub-image 210 and the position coordinates of a plurality of feature points in the mask sub-image 220.

As illustrated in FIG. 2C, the mask image 230 includes a target feature sub-image 231 and a target feature sub-image 232. The target feature sub-image 231 is the first limit position where the target feature is in the first limit state, and the target feature sub-image 232 is the second limit position where the target feature is in the second limit state.

For step S22, for example, the target feature sub-image 231 and the target feature sub-image of the mask image 230 are uniformly sampled respectively.

In some embodiments of the present disclosure, the sampling result include position coordinates of each of the plurality of sampling points at the first limit position and at the second limit position respectively.

For example, as illustrated in FIG. 2C, the abscissas x1, x2, . . . of the plurality of sampling points of the upper eyelashes are determined, and the ordinates of the plurality of sampling points in the target feature sub-image 231 and the target feature sub-image 232 are acquired respectively. The ordinates of the sampling points in the target feature sub-image 231 are the position coordinates of the sampling points at the first limit position. The ordinates of the sampling points in the target feature sub-image 232 are the position coordinates of the sampling points at the second limit position.

As illustrated in FIG. 2C, uniform sampling is performed to obtain the coordinates (x1, y1), . . . , (xn, yn) at the first limit position and the coordinates (x1, b1), . . . , (xn, bn) at the second limit position of the plurality of sampling points of the upper eyelashes.

For step S23, for example, according to the position coordinates of each sampling point respectively at the first limit position and at the second limit position, the height difference between the first limit position and the second limit position of each sampling point is calculated, and the height difference between the first limit position and the second limit position of each sampling point is used as the limit deformation information. The limit deformation information acquired in this embodiment is relatively accurate, so that the initial virtual image can be driven more accurately.

For example, for each sampling point, the difference between the ordinate at the second limit position and the ordinate at the first limit position is calculated, and the difference is the height difference. For example, in the scenario illustrated in FIG. 2C, the height differences of the plurality of sampling points x1, . . . , xn are b1-y1, . . . , bn-yn respectively. In this embodiment, the limit deformation information includes the height differences of the sampling points x1, . . . , xn being b1-y1, . . . , bn-yn respectively.

FIG. 2D illustrates a method flow chart of step S23 in FIG. 2A provided by at least one embodiment of the present disclosure.

As illustrated in FIG. 2D, step S23 may include step S231 to step S233.

Step S231: calculating a height difference between the first limit position and the second limit position of each sampling point according to the position coordinates of each sampling point respectively at the first limit position and at the second limit position.

Step S232: performing a curve fitting on the plurality of sampling points according to the height difference to obtain a limit deformation value curve.

Step S233: substituting each target vertex in the target feature into the limit deformation value curve so as to obtain the limit deformation value of each target vertex in the target feature, each target vertex being corresponding to at least part of the feature points in the initial virtual sub-image.

In this embodiment, the limit deformation information includes the limit deformation value of each target vertex in the target feature. In this embodiment, a limit deformation value curve is obtained by fitting according to the height difference of a plurality of sampling points, and the limit deformation value of each target vertex in the target feature is obtained according to the limit deformation value curve, which can avoid some feature points of the edge portion of the target feature being omitted and not driven, thereby making the current virtual image completer and more realistic. For example, in a response to the feature points corresponding to the edge portions (e.g., the positions of the corners of the mouth) of the upper lip and lower lip being not driven, the corners of the mouth of the current virtual image are not closed when the mouth of the detection object is closed, thus causing the current virtual image incomplete and unrealistic.

In step S231, for example, the height difference between the first limit position and the second limit position of each sampling point may be calculated according to the method described above, and no further detail will be given herein.

In step S232, the curve fitting includes a polynomial fitting, and the limit deformation curve includes a polynomial curve. In some embodiments of the present disclosure, the degree of the polynomial may be determined according to the complexity and general shape of the virtual sub-image (image layer) that needs to be driven.

For example, the abscissas and height differences of the plurality of sampling points form fitting samples, e.g., the fitting samples are (x1, b1-y1), . . . , (xn, bn-yn). The fitting samples (x1, b1-y1), . . . , (xn, bn-yn) are substituted into the following polynomial to perform a polynomial fitting so as to obtain the limit deformation value curve.

$$y = ax^n + bx^{n-1} + cx^{n-2} + \ldots + wx + z$$

In step S233, in some embodiments of the present disclosure, the abscissa of each feature point in the virtual sub-image corresponding to the target feature is substituted into the limit deformation value curve so as to obtain the limit deformation value of each feature point. For the target vertexes in the target feature, for example, the X coordinates of a plurality feature points are extracted from the coordinates (X, Y, Z, W) described in step S50 above, and the X coordinates are transformed into the coordinates in the virtual sub-image corresponding to the target feature.

For step S30, in some embodiments of the present disclosure, the movement information includes a movement distance. In some other embodiments of the present disclosure, the movement information includes target positions to which the feature points in the initial virtual image need to move.

FIG. 3 illustrates a method flowchart of step S30 in FIG. 1A provided by at least one embodiment of the present disclosure.

As illustrated in FIG. 3, step S30 may include step S31 and step S32.

Step S31: determining the current state value of the target feature relative to the reference state according to the current feature information.

Step S32: determining the movement information of the feature points in the initial virtual image according to the current state value and the limit deformation information.

For step S31, the reference state may be preset by the designer. For example, the reference state is that the eyes are closed and/or the eyes are opened to the maximum extent.

The current state value may be a parameter used for reflecting the relationship between the current feature information and the reference feature information of the target feature when the detection object is in the reference state.

For example, the reference state is that the eyes are opened to the maximum extent, and the target features are eyelashes. The current state value can be a parameter that reflects the relationship between the position of the current eyelashes and the position of the eyelashes when the eyes are opened to the maximum extent.

In some embodiments of the present disclosure, step S31 may include acquiring a mapping relationship between feature information and a state value, and according to the mapping relationship and the current feature information, the current state value of the target feature relative to the reference state is determined.

For example, a plurality of samples are acquired, and each sample includes a corresponding relationship between sample feature information of the target feature and a sample state value; and a mapping function is constructed on the basis of the corresponding relationship, and the mapping function represents the mapping relationship between feature information and the state value.

For example, the sample feature information includes the first feature information and the second feature information, and the sample state value includes the first value corresponding to the first feature information and the second value corresponding to the second feature information. Constructing the mapping function includes constructing a system of linear equations, and substituting the first feature information and the first value, and the second feature information and the second value respectively into the system of linear equations. The mapping function is obtained by solving the system of linear equations.

For example, the system of linear equations is a system of linear equations in two unknowns. The first feature information is the position coordinate Y0 of the feature points on the eyelashes in the moving direction when the eyes are opened to the maximum extent in the sample, and the first value is 0. The second feature information is the position coordinate Y1 of the feature points on the eyelashes in the moving direction when the eyes are closed in the sample, and the second value is 1. The moving direction of the eyelashes is perpendicular to the width direction of the eyes. The first feature information and the second feature information may be the result obtained by statistical calculation on a plurality of samples. The system of linear equations in two unknowns is constructed according to (Y0, 0) and (Y1, 1), and the system of linear equations in two unknowns is solved to obtain a mapping function u=av+b, where a and b are a value obtained by solving the system of linear equations in two unknowns, v is the current feature information, and u is the current state value. For example, the current position coordinate v (e.g., the current coordinate of the feature point in the moving direction) of each feature point on the eyelashes is substituted into the mapping function u=av+b, and solving is carried out to obtain the current state value u corresponding to the current feature information v.

In some other embodiments of the present disclosure, the mapping relationship between feature information and a state value may also be a mapping relationship table, and the present disclosure does not limit the representation form of the mapping relationship.

In some embodiments of the present disclosure, the movement information includes a movement distance, and step S32 includes calculating the current state value and the limit deformation information so as to determine the movement distance of the feature points in the initial virtual image.

For example, the current state value and the limit deformation information are multiplied so as to determine the movement distance of the feature points in the initial virtual image.

For example, the limit deformation information is the limit deformation value described above. For the feature point x1 on the upper eyelashes, in response to the current state value being 0.5, then the moving distance of the feature point x1 is the product of 0.5 and b1-y1.

Referring back to FIG. 1A, for step S40, for example, the camera of the electronic device detects the current state of the target feature of the detection object, and drives the feature points in the initial virtual image to move following the current state, so that the current virtual image displayed by the electronic device is consistent with the current state of the target feature of the detection object.

In some embodiments of the present disclosure, step S40 includes: driving the feature points in the target virtual sub-image to move by a movement distance from a position where the initial state is located to a position where one of at least one limit state that is different from the initial state is located. For example, the initial state is the state displayed by the initial virtual image, and the position of the initial state is the position of the feature points in the initial virtual image.

For example, in the initial virtual image, the target virtual sub-image corresponding to the eyelashes is the image when the eyes are opened to the maximum extent, e.g., the position of the initial state is the position of the eyelashes in the target virtual sub-image when the eyes are opened to the maximum extent. After obtaining the movement information of the feature points in the target virtual sub-image corresponding to the eyelashes, the feature points in the target virtual sub-image corresponding to the eyelashes are driven to move from the position of the eyelashes in the target virtual sub-image when the eyes are opened to the maximum extent to the position of the eyelashes in the target virtual sub-image when the eyes are closed. That is, as illustrated in FIG. 2C, the feature points in the target virtual sub-image corresponding to the eyelashes are driven to move from the position illustrated in the target feature sub-image 231 to the position illustrated in the target feature sub-image 232.

In some other embodiments of the present disclosure, the movement information includes a target position, and step S40 includes: driving the feature points in the initial virtual image to move to the target position.

For example, the feature points in the target virtual sub-image corresponding to the eyelashes in the initial virtual image are driven to move to the target position.

In some embodiments of the present disclosure, for example, the target position is calculated according to the position of the initial state and the movement distance.

In some other embodiments of the present disclosure, in addition to steps S10 to S50, the method illustrated above with reference to FIG. 1A may further include: calculating the pitch angle, yaw angle and roll angle according to the current feature information, calculating the rotation matrix according to the pitch angle, yaw angle and roll angle, driving the feature points in the initial virtual image to move according to the movement information, and controlling the rotation of the initial virtual image according to the rotation matrix so as to generate the current virtual image corresponding to the current state.

For example, the detection object is a user, and the pitch angle, yaw angle, and roll angle are calculated according to 280 key points on the face of the user. The pitch angle is the angle at which the face rotates around the first axis, the yaw angle is the angle at which the face rotates around the second axis, and the roll angle is the angle at which the face rotates around the third axis. The first axis is perpendicular to the height direction of the face, the second axis is parallel to the height direction of the face, and the third axis is perpendicular to the first axis and the second axis. The pitch angle, yaw angle and roll angle are calculated according to the current feature information, and according to the pitch angle, yaw angle and roll angle, the rotation matrix is calculated by referring to relevant algorithms in related technologies, and no further detail will be given herein.

In this embodiment, the feature points in the initial virtual image are driven to move according to the movement information, and the rotation of the initial virtual image is controlled according to the rotation matrix so as to generate the current virtual image corresponding to the current state.

For example, in response to the head rotation of the detection object, the current virtual image displayed by the electronic device changes from a virtual image of the front face of the detection object to a virtual image of the side face of the detection object after the head rotation.

In this embodiment, the rotation of the initial virtual image may be controlled according to the rotation matrix, thus making the current virtual image more realistic and vivid.

In the embodiments of the present disclosure, the current virtual image changes following the current state of the target feature of the detection object detected by the electronic device, so that the electronic device can display a virtual image consistent with the current state of the target feature of the detection object.

FIG. 4 illustrates a schematic diagram of the effect of the image processing method provided by at least one embodiment of the present disclosure.

As illustrated in FIG. 4, the schematic diagram of the effect includes the state 401 at the first moment and the state 402 at the second moment of the detection object respectively.

The schematic diagram of the effect also includes the current virtual image 403 of the detection object displayed in the electronic device at the first moment, and the current virtual image 404 of the detection object displayed in the electronic device at the second moment.

As illustrated in FIG. 4, the detection object opens the eyes and closes the mouth at the first moment. Correspondingly, at this time, the eyes in the current virtual image 403 of the detection object displayed in the electronic device are also open and the mouth is also closed.

As illustrated in FIG. 4, the detection object closes the eyes and opens the mouth at the second moment. Correspondingly, at this time, the eyes in the current virtual image 404 of the detection object displayed in the electronic device are also closed and the mouth is also open.

Figure 5:
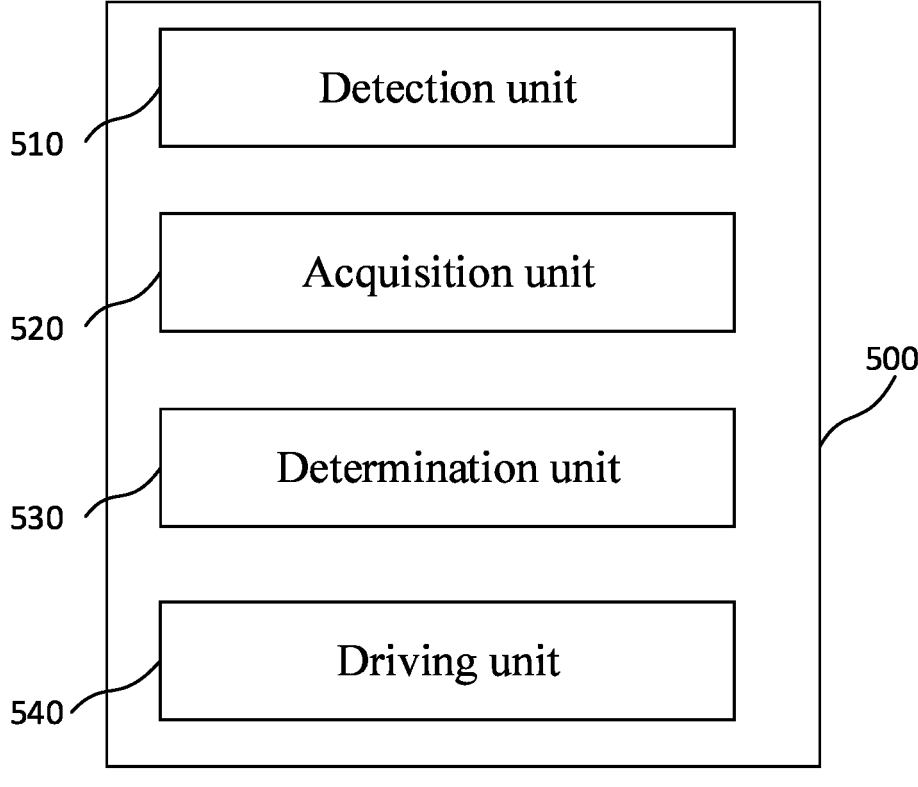
FIG. 5 illustrates a schematic block diagram of an image processing apparatus provided by at least one embodiment of the present disclosure.

FIG. 5 illustrates a schematic block diagram of an image processing apparatus 500 provided by at least one embodiment of the present disclosure.

For example, as illustrated in FIG. 5, the image processing apparatus 500 includes a detection unit 510, an acquisition unit 520, a determination unit 530, and a driving unit 540.

The detection unit 510 is configured to acquire current feature information of the detection object in response to having detected a detection object, and the current feature information is used for indicating a current state of a target feature of the detection object. The detection unit 510, for example, may execute step S10 described in FIG. 1A.

The acquisition unit 520 is configured to acquire limit deformation information of the target feature, and the limit deformation information is obtained by calculating the target virtual sub-image when the target feature is in a limit state. The acquisition unit 520, for example, may execute step S20 described in FIG. 1A.

The determination unit 530 is configured to determine movement information of feature points in the initial virtual image on the basis of the limit deformation information and the current feature information, the initial virtual image is obtained by superimposing a plurality of virtual sub-images, and the plurality of virtual sub-images includes at least part of the target virtual sub-image. The determination unit 530, for example, may execute step S30 described in FIG. 1A.

The driving unit 540 is configured to drive the feature points in the initial virtual image to move according to the movement information so as to generate a current virtual image corresponding to the current state. The driving unit 540, for example, may execute step S40 described in FIG. 1A.

For example, the detection unit 510, the acquisition unit 520, the determination unit 530, and the driving unit 540 may be hardware, software, firmware, or any feasible combination thereof. For example, the detection unit 510, the acquisition unit 520, the determination unit 530, and the driving unit 540 may be dedicated or universal circuits, chips or apparatuses, or may be a combination of a processor and a memory. Regarding the specific implementation forms of each of the above units, no limitation is made in this regard in the embodiments of the present disclosure.

It should be noted that in the embodiments of the present disclosure, each unit of the image processing apparatus 500 corresponds to each step of the aforementioned image processing method. The specific functions of the image processing apparatus 500 may refer to the relevant description of the image processing method, and no further detail will be given herein. The components and structures of the image processing apparatus 500 illustrated in FIG. 5 are only exemplary and are non-limiting. The image processing apparatus 500 may further include other components and structures as required.

At least one embodiment of the present disclosure also provides an electronic device, which includes a processor and a memory. The memory includes one or more computer program modules. The one or more computer program modules are stored in the memory and configured to be executed by the processor, and the one or more computer program modules include instructions for implementing the image processing method mentioned above. The electronic device can reduce the difficulty in designing and driving virtual images.

Figure 6:
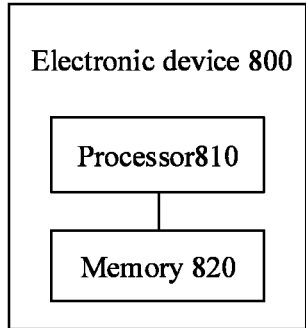
FIG. 6 illustrates a schematic block diagram of an electronic device provided by at least one embodiment of the present disclosure.

FIG. 6 is a schematic block diagram of an electronic device provided by some embodiments of the present disclosure. As illustrated in FIG. 6, the electronic device 800 includes a processor 810 and a memory 820. The memory 820 is used to store non-transitory computer-readable instructions (e.g., one or more computer program modules). The processor 810 is used to execute the non-transitory computer-readable instructions, and when the non-transitory computer-readable instructions are executed by the processor 810, one or more of the steps of the image processing method described above are executed. The memory 820 and processor 810 can be interconnected by a bus system and/or other form of connection mechanism (not illustrated).

For example, the processor 810 may be a central processing unit (CPU), a graphics processing unit (GPU), or other processing units with the data processing capability and/or the program execution capability. For example, the central processing unit (CPU) may be an x86 or ARM architecture, or the like. The Processor 810 may be a universal or dedicated processor that can control other components in the electronic device 800 to executed the desired function.

For example, the memory 820 may include any combination of one or more computer program products. The computer program product may include various computer-readable storage media, such as a volatile memory and/or non-volatile memory. The volatile memory may include, for example, a random access memory (RAM) and/or cache. The non-volatile memory may include, for example, a read-only memory (ROM), hard disks, an erasable programmable read-only memory (EPROM), a portable compact disk read-only memory (CD-ROM), a USB memory, a flash memory, and the like. One or more computer program modules may be stored on a computer-readable storage medium, and the processor 810 may execute one or more computer program modules to implement various functions of the electronic device 800. The computer-readable storage medium may further store various application programs, various data, various data used and/or generated by applications, and the like.

It should be noted that in the embodiments of the present disclosure, the specific functions and technical effects of the electronic device 800 can refer to the description of the image processing method above, which are not repeated here.

Figure 7:
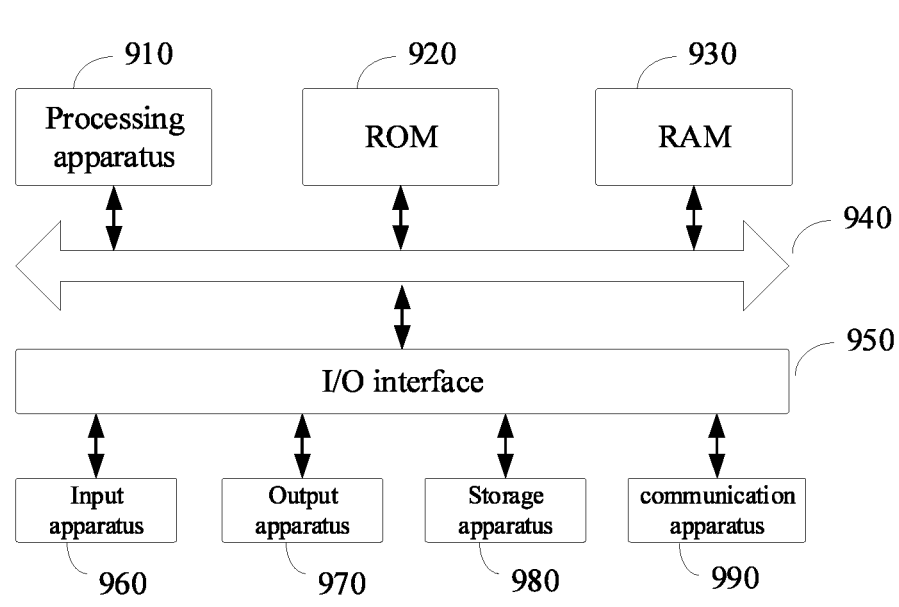
FIG. 7 illustrates a schematic block diagram of another electronic device provided by at least one embodiment of the present disclosure.

FIG. 7 is a schematic block diagram of another electronic device provided by some embodiments of the present disclosure. The electronic device 900, for example, is suitable for implementing the image processing method provided by the embodiments of the present disclosure. The electronic device 900 may be a terminal device and the like. It should be noted that the electronic device 900 illustrated in FIG. 7 is only an example and does not bring any limitation on the functions and scope of use of the embodiments of the present disclosure.

As illustrated in FIG. 7, the electronic device 900 may include a processing device 910 (e.g., a central processing unit, a graphics processing unit, etc.), which can execute various appropriate actions and processing according to a program stored in a read-only memory (ROM) 920 or a program loaded from the storage device 980 into a random access memory (RAM) 930. The RAM 930 further stores various programs and data that are required by the operation of the electronic device 900. The processing unit 910, ROM

920 and RAM 930 are connected to each other via bus 940. The input/output (I/O) interface 950 is also connected to the bus 940.

Generally, the following apparatuses can be connected to the I/O interface 950: including an input apparatus 960 such as a touch screen, a touchpad, a keyboard, a mouse, a camera, a microphone, an accelerometer, a gyroscope, and the like; including an output apparatus 970 such as a liquid crystal display (LCD), a speaker, a vibrator, and the like; including a storage apparatus 980 such as a tape, a hard disk, and the like; and including a communication apparatus 990. The communication apparatus 990 may allow the electronic device 900 to communicate wirelessly or wired with other electronic devices so as to exchange data. Although FIG. 7 illustrates the electronic device 900 with various apparatuses, it should be understood that all of the apparatuses illustrated are not required to be implemented or had, and the electronic device 900 may alternatively implement or have more or fewer apparatuses.

For example, according to the embodiment of the present disclosure, the image processing method described above may be implemented as a computer software program. For example, the embodiment of the present disclosure includes a computer program product. The computer program product includes a computer program carried on a non-transitory computer-readable medium. The computer program includes a program code for implementing the image processing method described above. In such an embodiment, the computer program can be downloaded and installed from a network through a communication device 990, or installed from a storage device 980, or installed from a ROM 920. When the computer program is executed by the processing apparatus 910, the defined functions in the image processing method provided by the embodiments of the present disclosure can be implemented.

At least one embodiment of the present disclosure further provides a computer-readable storage medium. The computer-readable storage medium is used for storing non-transitory computer-readable instructions. When the non-transitory computer-readable instructions are executed by a computer, the image processing method mentioned above can be implemented. The computer-readable storage medium can be used to reduce the difficulty in designing and driving virtual images.

Figure 8:
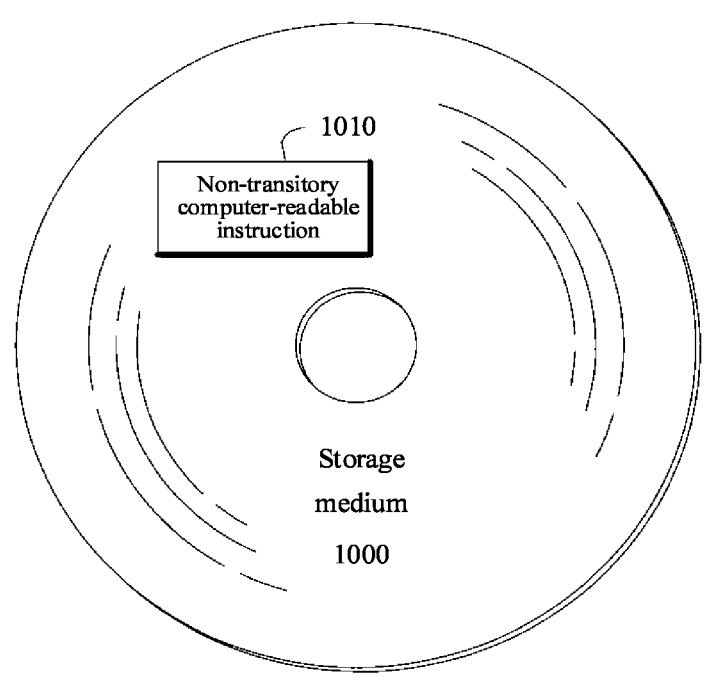
FIG. 8 illustrates a schematic diagram of a computer-readable storage medium provided by at least one embodiment of the present disclosure.

FIG. 8 is a schematic diagram of a storage medium provided by some embodiments of the present disclosure. As illustrated in FIG. 8, the storage medium 1000 is used to store non-transitory computer-readable instructions 1010. For example, when the non-transitory computer-readable instructions 1010 are executed by a computer, one or more of the steps of the image processing method described above can be executed.

For example, the storage medium 1000 can be applied to the electronic device 800 mentioned above. For example, the storage medium 1000 may be the memory 820 in the electronic device 800 illustrated in FIG. 6. For example, the related description of the storage medium 1000 may refer to the corresponding description of the memory 820 in the electronic device 800 illustrated in FIG. 6, which is not repeated here.

There are several points to be noted:

(1) The drawings of the embodiments of the present disclosure relate only to the structures to which the embodiments of the present disclosure relate, and other structures may refer to general designs.

(2) Without conflict, the embodiments of the present disclosure and the characteristics in the embodiments may be combined with each other to obtain a new embodiment.

The above description is only the specific embodiments of the present disclosure, but the protection scope of the present disclosure is not limited to the description, and the protection scope of the present disclosure is determined by the appended claims.

What is claimed is:

1. An image processing method, comprising:

in response to having detected a detection object, acquiring current feature information of the detection object, wherein the current feature information is used for indicating a current state of a target feature of the detection object;

acquiring limit deformation information of the target feature, wherein the limit deformation information is obtained by calculating a target virtual sub-image when the target feature is in at least one limit state;

determining movement information of feature points in an initial virtual image on a basis of the limit deformation information and the current feature information, wherein the initial virtual image is obtained by superimposing a plurality of virtual sub-images, and the plurality of the virtual sub-images comprise a target virtual sub-image corresponding to at least part of the at least one limit state; and driving the feature points in the initial virtual image to move according to the movement information, so as to generate a current virtual image corresponding to the current state, wherein the method further comprises: acquiring depth information of each of the plurality of the virtual sub-images, and obtaining the initial virtual image on a basis of the depth information of each of the plurality of the virtual sub-images and the plurality of the virtual sub-images, wherein the depth information of each of the plurality of the virtual sub-images comprises a depth value of each of the virtual sub-images and a depth value of feature points in each of the virtual sub-images, each of the virtual sub-images corresponds to one of a plurality of features to be virtualized of the detection object, and the plurality of the features to be virtualized comprise the target feature, wherein in a direction perpendicular to a face of the detection object, the depth value of each of the virtual sub-images is proportional to a first distance, and the first distance is a distance between a feature to be virtualized corresponding to the virtual sub-image and eyes of the detection object; and the depth value of the feature points in each of the virtual sub-images is proportional to the first distance.

2. The method according to claim 1, wherein the acquiring the limit deformation information of the target feature comprises:

determining a first limit position and a second limit position of the target feature according to the target virtual sub-image in the at least one limit state;

sampling the first limit position and the second limit position so as to obtain a sampling result of a plurality of sampling points; and calculating the sampling result so as to obtain the limit deformation information of the target feature.

3. The method according to claim 2, wherein the target virtual sub-image in the at least one limit state comprises a first image layer in a first limit state and a second image layer in a second limit state; and the determining the first limit position and the second limit position of the target feature according to the target virtual sub-image in the at least one limit state, comprises:

masking alpha channels of the first image layer and the second image layer respectively so as to obtain two mask sub-images, and merging the two mask sub-images into one mask image; and determining the first limit position and the second limit position according to the mask image.

4. The method according to claim 3, wherein the sampling result comprises position coordinates of each of the plurality of the sampling points respectively at the first limit position and at the second limit position, the calculating the sampling result so as to obtain the limit deformation information of the target feature, comprises:

calculating a height difference between the first limit position and the second limit position of each sampling point according to the position coordinates of each sampling point respectively at the first limit position and at the second limit position;

obtaining a limit deformation value curve by performing a curve fitting on the plurality of the sampling points according to the height difference; and substituting each of target vertexes in the target feature into the limit deformation value curve so as to obtain a limit deformation value of each of the target vertexes in the target feature, wherein each of the target vertexes is corresponding to at least part of the feature points in an initial virtual sub-image.

5. The method according to claim 4, wherein the curve fitting comprises a polynomial fitting, and the limit deformation curve comprises a polynomial curve.

6. The method according to claim 3, wherein the sampling result comprises position coordinates of each sampling point of the plurality of the sampling points respectively at the first limit position and at the second limit position, the calculating the sampling result so as to obtain the limit deformation information of the target feature comprises:

calculating a height difference between the first limit position and the second limit position of each sampling point according to the position coordinates of each sampling point respectively at the first limit position and at the second limit position; and using the height difference between the first limit position and the second limit position of each sampling point as the limit deformation information.

7. The method according to claim 1, wherein the determining the movement information of feature points in the initial virtual image on the basis of the limit deformation information and the current feature information, comprises:

determining a current state value of the target feature relative to a reference state according to the current feature information; and determining the movement information of the feature points in the initial virtual image according to the current state value and the limit deformation information.

8. The method according to claim 7, wherein the determining the current state value of the target feature relative to the reference state according to the current feature information, comprises:

acquiring a mapping relationship between feature information and a state value; and determining the current state value of the target feature relative to the reference state according to the mapping relationship and the current feature information.

9. The method according to claim 8, wherein the acquiring the mapping relationship between the feature information and the state value comprises:

acquiring a plurality of samples, wherein each of the samples comprises a corresponding relationship between sample feature information of the target feature and a sample state value; and constructing a mapping function on the basis of the corresponding relationship, wherein the mapping function represents the mapping relationship between the feature information and the state value.

10. The method according to claim 9, wherein the sample feature information comprises first feature information and second feature information, and the sample state value comprises a first value corresponding to the first feature information and a second value corresponding to the second feature information, the constructing the mapping function on the basis of the corresponding relationship comprises:

constructing a system of linear equations; and substituting the first feature information and the first value, and the second feature information and the second value respectively into the system of the linear equations, and solving the system of the linear equations to obtain the mapping function.

11. The method according to claim 7, wherein the movement information comprises a movement distance, the determining the movement information of the feature points in the initial virtual image according to the current state value and the limit deformation information, comprises:

calculating the current state value and the limit deformation information so as to determine the movement distance of the feature points in the initial virtual image.

12. The method according to claim 11, wherein the calculating the current state value and the limit deformation information so as to determine the movement distance of the feature points in the initial virtual image comprises:

multiplying the current state value and the limit deformation information so as to determine the movement distance of the feature points in the initial virtual image.

13. The method according to claim 1, wherein the movement information comprises a movement distance, the driving the feature points in the initial virtual image to move according to the movement information comprises:

driving the feature points in the target virtual sub-image of the initial virtual image to move by the movement distance from a position where an initial state is located to a position where one of at least one limit state different from the initial state is located.

14. The method according to claim 1, wherein the movement information comprises a target position, the driving the feature points in the initial virtual image to move according to the movement information comprises:

driving the feature points in the initial virtual image to move to the target position.

15. The method according to claim 1, wherein the current feature information comprises comparison information between the target feature and a reference feature of the detection object, wherein the comparison information does not change when a distance of the detection object relative to an image acquisition device used for detecting the detection object changes.

16. The method according to claim 1, wherein the target feature comprises at least one of eyelashes and a mouth, when the target feature is the eyelashes, a limit state of the target feature is a state of the target feature upon opening the eyes of the detection object, and when the target feature is the mouth, the limit state of the target feature is a state of the mouth upon opening the mouth to a maximum extent.

17. An electronic device, comprising:

a processor, and a memory, comprising one or more computer program instructions;

wherein the one or more computer program instructions are stored in the memory, and implement an image processing method upon being executed by the processor, wherein the image processing method comprises:

in response to having detected a detection object, acquiring current feature information of the detection object, wherein the current feature information is used for indicating a current state of a target feature of the detection object;

acquiring limit deformation information of the target feature, wherein the limit deformation information is obtained by calculating a target virtual sub-image when the target feature is in at least one limit state;

determining movement information of feature points in an initial virtual image on a basis of the limit deformation information and the current feature information, wherein the initial virtual image is obtained by superimposing a plurality of virtual sub-images, and the plurality of the virtual sub-images comprise a target virtual sub-image corresponding to at least part of the at least one limit state; and driving the feature points in the initial virtual image to move according to the movement information, so as to generate a current virtual image corresponding to the current state, wherein the method further comprises: acquiring depth information of each of the plurality of the virtual sub-images, and obtaining the initial virtual image on a basis of the depth information of each of the plurality of the virtual sub-images and the plurality of the virtual sub-images, wherein the depth information of each of the plurality of the virtual sub-images comprises a depth value of each of the virtual sub-images and a depth value of feature points in each of the virtual sub-images, each of the virtual sub-images corresponds to one of a plurality of features to be virtualized of the detection object, and the plurality of the features to be virtualized comprise the target feature, wherein in a direction perpendicular to a face of the detection object, the depth value of each of the virtual sub-images is proportional to a first distance, and the first distance is a distance between a feature to be virtualized corresponding to the virtual sub-image and eyes of the detection object; and the depth value of the feature points in each of the virtual sub-images is proportional to the first distance.

18. A non-transitory computer-readable storage medium, storing non-temporary computer-readable instructions, wherein the computer-readable instructions implement an image processing method upon being executed by a processor, wherein the image processing method comprises:

in response to having detected a detection object, acquiring current feature information of the detection object, wherein the current feature information is used for indicating a current state of a target feature of the detection object;

acquiring limit deformation information of the target feature, wherein the limit deformation information is obtained by calculating a target virtual sub-image when the target feature is in at least one limit state;

determining movement information of feature points in an initial virtual image on a basis of the limit deformation information and the current feature information, wherein the initial virtual image is obtained by superimposing a plurality of virtual sub-images, and the plurality of the virtual sub-images comprise a target virtual sub-image corresponding to at least part of the at least one limit state; and driving the feature points in the initial virtual image to move according to the movement information, so as to generate a current virtual image corresponding to the current state, wherein the method further comprises: acquiring depth information of each of the plurality of the virtual sub-images, and obtaining the initial virtual image on a basis of the depth information of each of the plurality of the virtual sub-images and the plurality of the virtual sub-images, wherein the depth information of each of the plurality of the virtual sub-images comprises a depth value of each of the virtual sub-images and a depth value of feature points in each of the virtual sub-images, each of the virtual sub-images corresponds to one of a plurality of features to be virtualized of the detection object, and the plurality of the features to be virtualized comprise the target feature, wherein in a direction perpendicular to a face of the detection object, the depth value of each of the virtual sub-images is proportional to a first distance, and the first distance is a distance between a feature to be virtualized corresponding to the virtual sub-image and eyes of the detection object; and the depth value of the feature points in each of the virtual sub-images is proportional to the first distance.

\*   \*   \*   \*   \*